(12) United States Patent
Takezawa et al.

(10) Patent No.: US 8,273,136 B2
(45) Date of Patent: Sep. 25, 2012

(54) ELECTROCHEMICAL ELEMENT, AND METHOD AND APPARATUS FOR MANUFACTURING ELECTRODE THEREOF

(75) Inventors: Hideharu Takezawa, Nara (JP); Toshitada Sato, Osaka (JP); Kazuyoshi Honda, Osaka (JP)

(73) Assignee: Panasonic Corporation, Osaka (JP)

( * ) Notice: Subject to any disclaimer, the term of this patent is extended or adjusted under 35 U.S.C. 154(b) by 726 days.

(21) Appl. No.: 12/281,210

(22) PCT Filed: Dec. 27, 2007

(86) PCT No.: PCT/JP2007/075093
§ 371 (c)(1), (2), (4) Date: Aug. 29, 2008

(87) PCT Pub. No.: WO2008/114481
PCT Pub. Date: Sep. 25, 2008

(65) Prior Publication Data
US 2009/0098459 A1 Apr. 16, 2009

(30) Foreign Application Priority Data
Mar. 16, 2007 (JP) .................. 2007-068407

(51) Int. Cl.
*H01M 4/04* (2006.01)
*C23C 14/24* (2006.01)
*C23C 16/44* (2006.01)
*B05D 5/12* (2006.01)
*C23C 14/34* (2006.01)

(52) U.S. Cl. .......... 29/623.1; 29/623.5; 204/192.15; 204/298.07; 204/298.25; 427/58; 427/77; 427/124; 118/719

(58) Field of Classification Search .......... 29/623.1, 29/623.5; 204/192.15, 298.07, 298.24, 298.52; 427/58, 77, 124; 118/718, 719
See application file for complete search history.

(56) References Cited

U.S. PATENT DOCUMENTS

| | | | | |
|---|---|---|---|---|
| 5,411,592 A * | 5/1995 | Ovshinsky et al. | ........... | 118/718 |
| 5,755,888 A * | 5/1998 | Torii et al. | ........... | 118/719 |
| 5,773,088 A * | 6/1998 | Bhat | ........... | 427/294 |
| 6,214,120 B1 * | 4/2001 | Kim | ........... | 118/719 |
| 2002/0036131 A1 | 3/2002 | Kugai et al. | | |
| 2006/0286458 A1 * | 12/2006 | Sato et al. | ........... | 429/231.95 |

FOREIGN PATENT DOCUMENTS

| | | | |
|---|---|---|---|
| JP | 62044960 A * | 2/1987 | |
| JP | 02155162 A * | 6/1990 | |
| JP | 10-233209 | 9/1998 | |
| JP | 2001-11611 | 1/2001 | |
| JP | 2002-83594 | 3/2002 | |
| JP | 2002-100346 | 4/2002 | |
| JP | 2002-279974 | 9/2002 | |
| JP | 2003-17040 | 1/2003 | |
| JP | 2003-277920 | 10/2003 | |
| JP | 2005-38720 | 2/2005 | |
| JP | 2005-196970 | 7/2005 | |
| JP | 2006164954 A * | 6/2006 | |
| JP | 2006206417 A * | 8/2006 | |
| JP | 2007-122992 | 5/2007 | |

* cited by examiner

*Primary Examiner* — Gregg Cantelmo
(74) *Attorney, Agent, or Firm* — McDermott Will & Emery LLP

(57) ABSTRACT

A method for manufacturing an electrode of an electrochemical element includes: (A) forming an active material layer on a current collector; and (B) providing lithium to the active material layer. The A step and the B step are carried out in continuous space.

3 Claims, 6 Drawing Sheets

ELECTROCHEMICAL ELEMENT, AND METHOD AND APPARATUS FOR MANUFACTURING ELECTRODE THEREOF

RELATED APPLICATIONS

This application is the U.S. National Phase under 35 U.S.C. §371 of International Application No. PCT/JP2007/075093, filed on Dec. 27, 2007, which in turn claims the benefit of Japanese Application No. 2007-068407, filed on Mar. 16, 2007, the disclosures of which Applications are incorporated by reference herein.

TECHNICAL FIELD

The present invention relates to a manufacturing method including a process for providing lithium to an active material layer of an electrode of an electrochemical element and a manufacturing apparatus, as well as an electrochemical element using the electrode manufactured by using the manufacturing method and apparatus. More particularly, it relates to a manufacturing method including a process for providing lithium to a negative electrode of a non-aqueous electrolyte secondary battery, a manufacturing apparatus, and a non-aqueous electrolyte secondary battery using the negative electrode manufactured by employing the manufacturing method and apparatus.

BACKGROUND ART

Recently, with the widespread use of portable and cordless electronic equipment, the expectation has been also increasing for compact secondary batteries with lightweight and large energy density as a driving power source for such equipment. Furthermore, technology development of not only batteries used for small consumer goods but also large secondary batteries for electric power storages and electric vehicles, which require a long-time durability and safety, has been accelerated. From such a viewpoint, a non-aqueous electrolyte secondary battery having high voltage and large energy density, in particular, a lithium secondary battery is expected as a power source for electronic equipment, electric power storage and an electric vehicle.

A non-aqueous electrolyte secondary battery includes a positive electrode, a negative electrode, a separator and a non-aqueous electrolyte both interposed therebetween. A separator is mainly composed of a microporous polyolefin film. As a non-aqueous electrolyte, a liquid-state non-aqueous electrolyte (non-aqueous electrolyte solution) obtained by dissolving a lithium salt such as $LiBF_4$ and $LiPF_6$ in an aprotic organic solvent is used. As an active material for the positive electrode, lithium cobalt oxide (for example, $LiCoO_2$) is used. Lithium cobalt oxide has a high electric potential with respect to lithium, is excellent in safety and is synthesized relatively easily. As an active material for the negative electrode, various carbon materials such as graphite are used. Non-aqueous electrolyte secondary batteries having such a configuration are made into practical use.

Since graphite used as an active material for a negative electrode can absorb one lithium atom per six carbon atoms theoretically, a theoretical capacity density of graphite is 372 mAh/g. However, the actual capacity density is reduced to about 310 to 330 mAh/g by a capacity loss due to the irreversible capacity. Therefore, it is basically difficult to obtain a carbon material capable of absorbing and releasing a lithium ion at this capacity density or more.

Then, in the circumstances where batteries with a larger energy density are demanded, silicon (Si), tin (Sn), germanium (Ge) and oxides or alloys thereof have been expected as a negative electrode active material having a large theoretical capacity density. Among them, Si and oxide of Si have been widely studied because they are inexpensive.

However, when Si, Sn, Ge and oxides or alloys thereof absorb lithium ions, the crystalline structure thereof is changed and the volume thereof is increased. When the active material largely expands at the time of charging, the contact failure between an active material and a current collector occurs. Consequently, the charge and discharge cycle lifetime is short. In order to address such a problem, the following proposals have been made.

For example, from the viewpoint of addressing a problem of the contact failure between the active material and the current collector due to expansion, a method for forming a thin film of an active material on the surface of a current collector has been proposed (for example, see Patent document 1). Furthermore, a method for forming an active material in a columnar shape and in an inclined state on the surface of a current collector has been proposed (for example, see Patent document 2). According to these proposals, stable current collection can be secured by strongly bonding an active material and a current collector to each other. In particular, space that is necessary and sufficient to absorb expansion is secured around the columnar active material in the latter case. Therefore, collapse of the negative electrode itself due to the expansion and contraction of the active material is prevented, and pressure stress to the separator and the positive electrode is reduced, and thereby, the charge and discharge cycle characteristic can be specifically improved.

However, when silicon oxide ($SiO_x(0<x<2)$) is used as the active material, an irreversible capacity generated at the initial charge is very large. Therefore, when such a negative electrode is used as it is in combination with the positive electrode, a large portion of the reversible capacity of the positive electrode is consumed as the irreversible capacity. Therefore, in order to realize a large capacity battery by using silicon oxide as an active material for a negative electrode, it is necessary to compensate lithium from other than positive electrode.

Therefore, for compensating lithium, a large number of methods for providing metallic lithium to a negative electrode and allowing it to be absorbed in the negative electrode by a solid phase reaction have been proposed. For example, a method including a process of vapor-depositing lithium on the surface of a negative electrode and a process of storing has been proposed (for example, Patent document 3).

However, when an active material is formed by the method described in Patent documents 1 and 2, then the negative electrode is returned to the air, and then lithium is vapor-deposited on a surface of the negative electrode as described in Patent document 3, the active material may be reacted with water or oxygen in the air before lithium is vapor-deposited. Thus, the degree of oxidation of the active material is changed and it is displaced from the intended degree of oxidation. In an extreme case, the active material generates heat, thereby making handling difficult. Furthermore, when water is adsorbed on the surface of the active material, lithium does not easily diffuse into the active material even when lithium is vapor-deposited. Therefore, the vapor-deposited lithium may not be efficiently used for compensation of the irreversible capacity.

Patent document 1: Japanese Patent Unexamined Publication No. 2002-83594

Patent document 2: Japanese Patent Unexamined Publication No. 2005-196970

Patent document 3: Japanese Patent Unexamined Publication No. 2005-38720

SUMMARY OF THE INVENTION

The present invention addresses the problems discussed above and aims to provide a method for manufacturing an electrode of an electrochemical element having a large capacity by allowing an active material to have an intended composition and by providing lithium efficiently.

In the method for manufacturing an electrode of an electrochemical element in accordance with the present invention, an active material layer is formed on the current collector and lithium is provided to the active material layer in continuous space. In this way, by forming an active material layer and providing lithium continuously in the same space, an active material having an intended composition can be produced and lithium can be provided efficiently. Consequently, it is possible to provide an electrochemical element having a large capacity in which the irreversible capacity caused by the electrode can be uniformly compensated.

DETAILED DESCRIPTION OF THE PREFERRED EMBODIMENTS

Hereinafter, exemplary embodiments of the present invention are described with reference to drawings in which a non-aqueous electrolyte secondary battery is employed as an example of an electrochemical element and a negative electrode is employed as an example of an electrode. Note here that the present invention is not limited to contents described below as long as it is based on basic features described in this specification. That is to say, the present invention may be applied to a positive electrode of a non-aqueous electrolyte secondary battery or applied to an electrode of an electrochemical capacitor besides a non-aqueous electrolyte secondary battery.

Exemplary Embodiment

Figure 1:
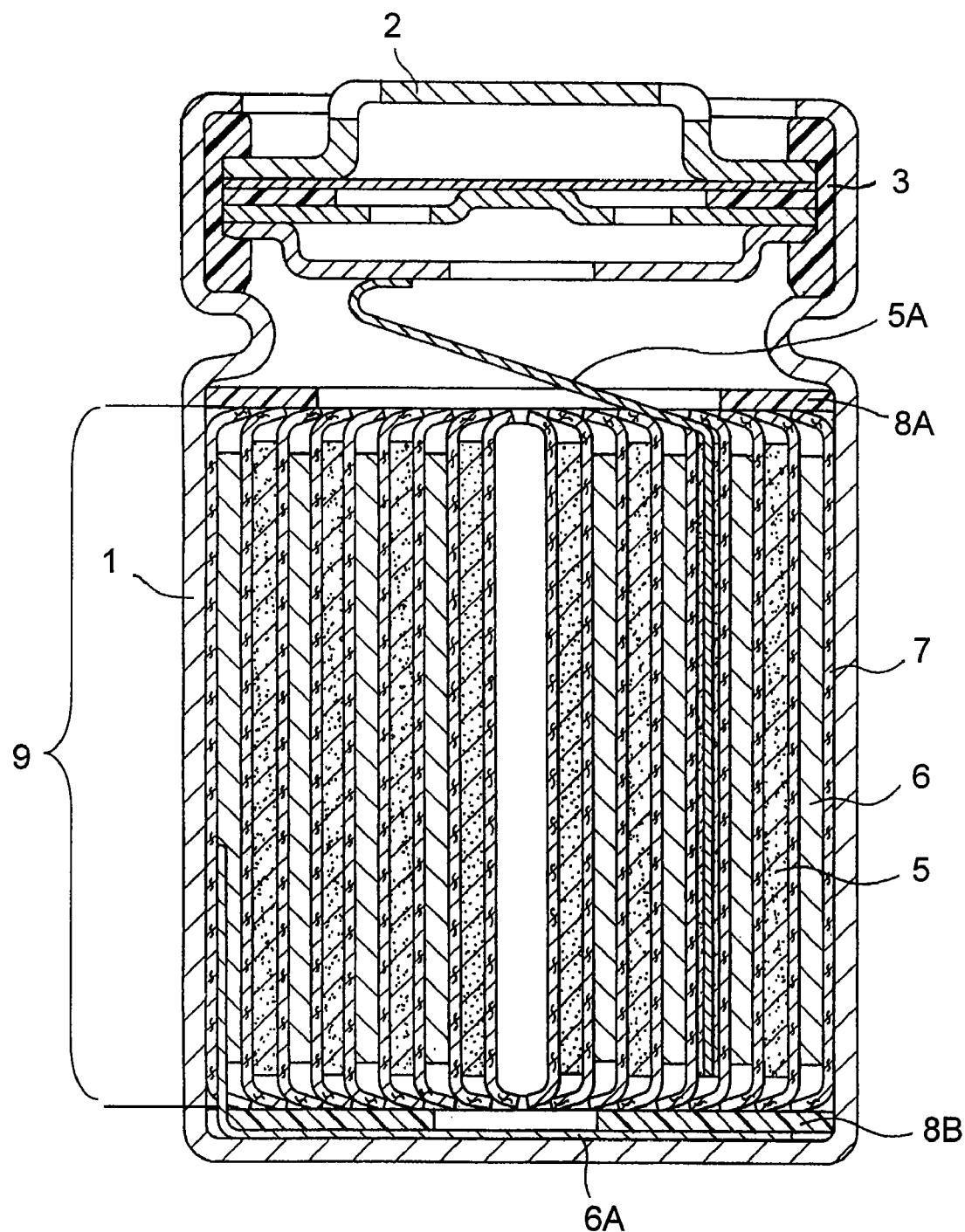
FIG. 1 is a longitudinal sectional view showing a non-aqueous electrolyte secondary battery in accordance with an exemplary embodiment of the present invention.

FIG. 1 is a longitudinal sectional view showing a non-aqueous electrolyte secondary battery in accordance with an exemplary embodiment of the present invention. Herein, a cylindrical battery is described as an example. This non-aqueous electrolyte secondary battery includes metallic case 1 and electrode group 9 accommodated in case 1. Case 1 is made of stainless steel or nickel-plated iron. Electrode group 9 is produced by winding negative electrode 6 as a first electrode and positive electrode 5 as a second electrode via separator 7 therebetween in a spiral shape. Upper insulating plate 8A is disposed at the upper part of electrode group 9, and lower insulating plate 8B is disposed at the lower part of electrode group 9. An opening end of case 1 is sealed with sealing plate 2 via gasket 3 by caulking case 1 with respect to sealing plate 2. One end of positive electrode lead 5A made of aluminum is attached to positive electrode 5. Another end of positive electrode lead 5A is coupled to sealing plate 2 that also serves as a positive terminal. One end of negative electrode lead 6A made of nickel is attached to negative electrode 6. Another end of negative electrode lead 6A is coupled to case 1 that also serves as a negative electrode terminal. Electrode group 9 is impregnated with a non-aqueous electrolyte (not shown) serving as an electrolyte. That is to say, a non-aqueous electrolyte is interposed between positive electrode 5 and negative electrode 6.

In general, positive electrode 5 includes a positive current collector and a positive electrode mixture supported thereby. The positive electrode mixture can include a binder, a conductive agent, and the like, in addition to a positive electrode active material. Positive electrode 5 is produced by, for example, preparing a positive electrode mixture slurry by mixing a positive electrode mixture composed of a positive electrode active material and an arbitrary component with a liquid component, and then coating and drying the obtained slurry on a positive current collector.

As the positive electrode active material of the non-aqueous electrolyte secondary battery, lithium-composite metal oxides can be used. An example thereof includes $Li_xCoO_2$, $Li_xNiO_2$, $Li_xMnO_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$. Herein, M denotes at least one selected from Na, Mg, Sc, Y, Mn, Fe, Co, Ni, Cu, Zn, Al, Cr, Pb, Sb and B, and $0 \leq x \leq 1.2$, $0 \leq y \leq 0.9$ and $0 \leq z \leq 1.9$ are satisfied. Note here that the value x showing the molar ratio of lithium represents a value right after the active material is produced, and the value is changed by charge and discharge. Furthermore, a part of these lithium-containing compounds may be substituted by a different kind of element. The surface of the lithium-containing compounds may be treated with metal oxides, lithium oxide, a conductive agent, and the like, and the surface may be subjected to hydrophobic treatment.

An example of the binder of the positive electrode mixture may include polyvinylidene-fluoride (PVDF), polytetrafluoroethylene, polyethylene, polypropylene, aramid resin, polyamide, polyimide, polyamide-imide, polyacrylonitrile, polyacrylic acid, polymethylacrylate, polyethylacrylate, polyhexylacrylate, polymethacrylic acid, polymethylmethacrylate, polyethylmethacrylate, polyhexylmethacrylate, polyvinyl acetate, polyvinylpyrrolidone, polyether, polyethersulfone, hexafluoropolypropylene, styrene-butadiene rubber, carboxymethylcellulose, and the like. Furthermore, a copolymer of two or more kinds of materials selected from tetrafluoroethylene, hexafluoroethylene, hexafluoropropylene, perfluoro-alkylvinyl ether, vinylidenefluoride, chlorotrifluoroethylene, ethylene, propylene, pentafluoropropylene, fluoromethylvinyl ether, acrylic acid, and hexadiene, may be used. They can be used singly or in a combination of two or more thereof.

An example of the conductive agent can include graphites including natural graphites and artificial graphites; carbon blacks such as acetylene black, Ketjen black, channel black, furnace black, lampblack and thermal black; conductive fibers such as carbon fiber and metal fiber; metal powders such as aluminum powder; whiskers of conducive compounds such as zinc oxide, potassium titanate, and the like; conductive metal oxides such as titanium oxide; organic conductive materials such as phenylene derivatives, and the like.

It is desirable that the blending ratios of the positive electrode active material, conductive agent and binder are 80 to 97 weight %, 1 to 20%, and 2 to 7%, respectively.

As the positive current collector, a long porous conductive substrate or a non-porous conductive substrate can be used. As material to be used for the conductive substrate, stainless steel, aluminum, titanium, and the like can be used. The thickness of the current collector is not particularly limited. However, the thickness is preferably in the range from 1 to 500 μm, and more desirably in the range from 5 to 20 μm. When the thickness of the current collector is in the above-mentioned range, the weight of the electrode can be reduced while the electrode keeps an adequate strength.

For separator 7, microporous thin film, woven fabric, non-woven fabric, or the like, having a high ionic permeability and also having a predetermined mechanical strength and insulating property can be used. As materials for separator 7, for example, polyolefin such as polypropylene and polyethylene is preferable from the viewpoint of safety of a non-aqueous electrolyte secondary battery because it is excellent in durability and has a shutdown function. The thickness of separator 7 is generally in the range from 10 to 300 μm and desirably 40 μm or less. More preferably, it is in the range from 5 to 30 μm, and further preferably in the range from 10 to 25 μm. Furthermore, the microporous film may be a single layer film consisting of one kind of material or may be a composite film or a multi-layer film consisting of two or more kinds of materials. Furthermore, it is preferable that the porosity of separator 7 is in the range from 30 to 70%. Herein, the porosity means the area ratio of pores occupying the surface area of separator 7. The more preferable porosity of separator 7 is in the range from 35 to 60%.

As the non-aqueous electrolyte, liquid state, gel state, and solid state (solid polymer electrolyte) materials can be used. The liquid state non-aqueous electrolyte (non-aqueous electrolyte solution) can be obtained by dissolving an electrolyte salt (for example, lithium salt) in a non-aqueous solvent. The gel state non-aqueous electrolyte is composed of a liquid-state non-aqueous electrolyte and a polymer material holding the liquid state non-aqueous electrolyte. As the polymer material, for example, PVDF, polyacrylonitrile, polyethylene oxide, polyvinyl chloride, polyacrylate, polyvinylidenefluoride-hexafluoropropylene, or the like, can be used preferably.

As the non-aqueous solvent, a well-known non-aqueous solvent can be used. The kind of the non-aqueous solvent is not particularly limited. For example, cyclic carbonate ester, chain carbonate ester, cyclic carboxylate ester, or the like, can be used. The cyclic carbonate ester may include propylene carbonate (PC), ethylene carbonate (EC), and the like. The chain carbonate ester may include diethyl carbonate (DEC), ethyl methyl carbonate (EMC), dimethyl carbonate (DMC), and the like. The cyclic carboxylate ester may include γ-butyrolactone (GBL), γ-valerolactone (GVL), and the like. The non-aqueous solvent may be used singly or may be in a combination of two or more thereof.

The solute to be solved in a non-aqueous solvent may include $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, lithium lower aliphatic carboxylate, LiCl, LiBr, LiI, lithium chloroborane, borates, imide salts, and the like. The borates may include lithium bis(1,2-benzenedioleate(2-)-O,O') borate, lithium bis(2,3-naphthalenedioleate(2-)-O,O') borate, lithium bis(2,2'-biphenyldioleate(2-)-O,O') borate, lithium bis(5-fluoro-2-oleate-1-benzenesulfonate-O,O') borate, and the like. The imide salts may include lithium bistrifluoromethanesulfonate imide (($CF_3SO_2)_2NLi$), lithium trifluoromethanesulfonate nonafluorobutanesulfonate imide ($LiN(CF_3SO_2)(C_4F_9SO_2)$), lithium bispentafluoroethanesulfonate imide (($C_2F_5SO_2)_2$ NLi), and the like. The solute may be used singly or may be used in a combination of two or more thereof.

Furthermore, the non-aqueous electrolyte may include a material as an additive, which is decomposed on negative electrode 6 and is capable of forming a film having high conductivity with respect to lithium ions and increasing the charge and discharge efficiency. The additive having such a function may include vinylene carbonate, 4-methyl vinylene carbonate, 4,5-dimethyl vinylene carbonate, 4-ethyl vinylene carbonate, 4,5-diethyl vinylene carbonate, 4-propyl vinylene carbonate, 4,5-dipropyl vinylene carbonate, 4-phenyl vinylene carbonate, 4,5-diphenyl vinylene carbonate, vinyl ethylene carbonate, divinyl ethylene carbonate, and the like. These may be used singly or in a combination of two or more thereof. Among them, at least one selected from the group consisting of vinylene carbonate, vinyl ethylene carbonate, and divinyl ethylene carbonate is preferable. Note here that a part of hydrogen atoms of the above-mentioned compounds may be substituted by a fluorine atom. It is desirable that the amount of the additive to be solved in the non-aqueous electrolyte solution is 0.1 weight % or more and 15 weight % or less.

Furthermore, the non-aqueous electrolyte may contain a well-known benzene derivative that is decomposed at the time of overcharging and forms a film on positive electrode 5 so as to inactivate a battery. As such a benzene derivative, one having a phenyl group and a cyclic compound group neighboring to this phenyl group is preferred. As the cyclic compound group, a phenyl group, a cyclic ether group, a cyclic ester group, a cycloalkyl group, a phenoxy group, and the like, are preferred. A specific example of the benzene derivative may include cyclohexylbenzene, biphenyl, diphenyl ether, and the like. These may be used singly or may be in a combination of two or more thereof. However, it is desirable that the content of the benzene derivative is 10 volume % or less with respect to the entire non-aqueous solvent.

Next, negative electrode 6 and a method for manufacturing the same are described. Negative electrode 6 includes a current collector, and an active material layer formed on the surface of the current collector and being capable of electrochemically absorbing and releasing lithium ions. For the active material layer, in addition to a carbon material, materials such as silicon (Si) and tin (Sn) capable of absorbing and releasing a large quantity of lithium ions can be used. The ratio A/B of volume A in a charged state of the material with respect to volume B in a discharged state in this kind of active material is 1.2 or more. The volumes are decided by, for example, measuring the thickness before and after charging. Such a material can exert the effect of the present invention regardless of whether the material is any form of an elemental substance, an alloy, a compound, a solid solution and a composite material such as a silicon-containing material or a tin-containing material. That is to say, the silicon-containing material may include Si and $SiO_x$ (0<x<2) or an alloy, a compound or a solid solution thereof obtained by substituting a part of Si by at least one element selected from B, Mg, Ni, Ti, Mo, Co, Ca, Cr, Cu, Fe, Mn, Nb, Ta, V, W, Zn, C, N, and Sn. As the tin-containing material, $Ni_2Sn_4$, $Mg_2Sn$ and $SnO_x$ (0<x<2), $SnO_2$, $SnSiO_3$, LiSnO, and the like, can be used.

Example of formation of an active material layer from plural kinds of materials may include a compound containing Si, oxygen and nitrogen or a composite of plurality of compounds containing Si and oxygen with different constituting ratios of Si and oxygen. Among them, it is preferable that an active material layer is formed of $SiO_x$ ($0 \leq x \leq 2$). Thus, it is possible to obtain a non-aqueous electrolyte secondary battery having high efficiency in electrode reactions and large capacity at relatively low cost. Furthermore, $SiO_x$ ($0.3 \leq x \leq 1.3$) is preferred because the discharge capacity density is large and the expansion rate at the time of charging is smaller than that of Si elemental substance.

Furthermore, by using these materials, thin film composed of an active material may be directly formed on the current collector by using a technique such as a vacuum vapor deposition method, a sputtering method, and a CVD method. Such a manufacturing method has a property of improving a charge and discharge cycle characteristic because current collection can be always secured in an active material having a large capacity but having large expansion and contraction.

For the current collector, a metal foil such as stainless steel, nickel, copper, titanium, and the like, a thin film of carbon or conductive resin, and the like, can be used. In addition, a current collector that may be preliminary subjected to a surface treatment with carbon, nickel, titanium, and the like, may be used. Similar to the case of the positive electrode, the thickness of the current collector is not particularly limited, but it is preferably in the range from 1 to 500 μm and more preferably in the range from 5 to 20 μm. When the thickness of the current collector falls within the above-mentioned range, the weight of the electrode can be reduced while the electrode keeps an adequate strength.

Figure 2:
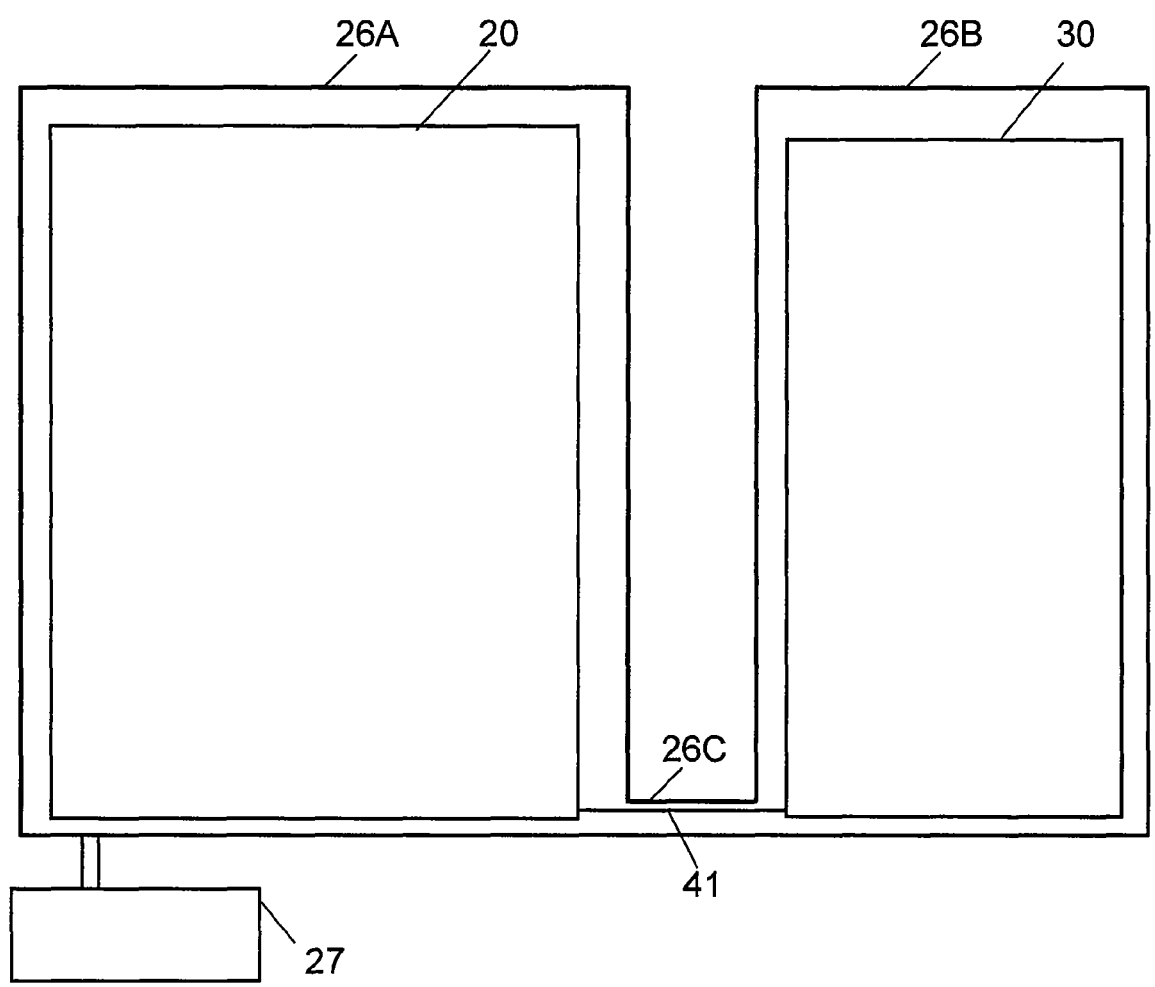
FIG. 2 is an entire configuration view showing an apparatus for manufacturing a negative electrode of the non-aqueous electrolyte secondary battery in accordance with the exemplary embodiment of the present invention.
Figure 3:
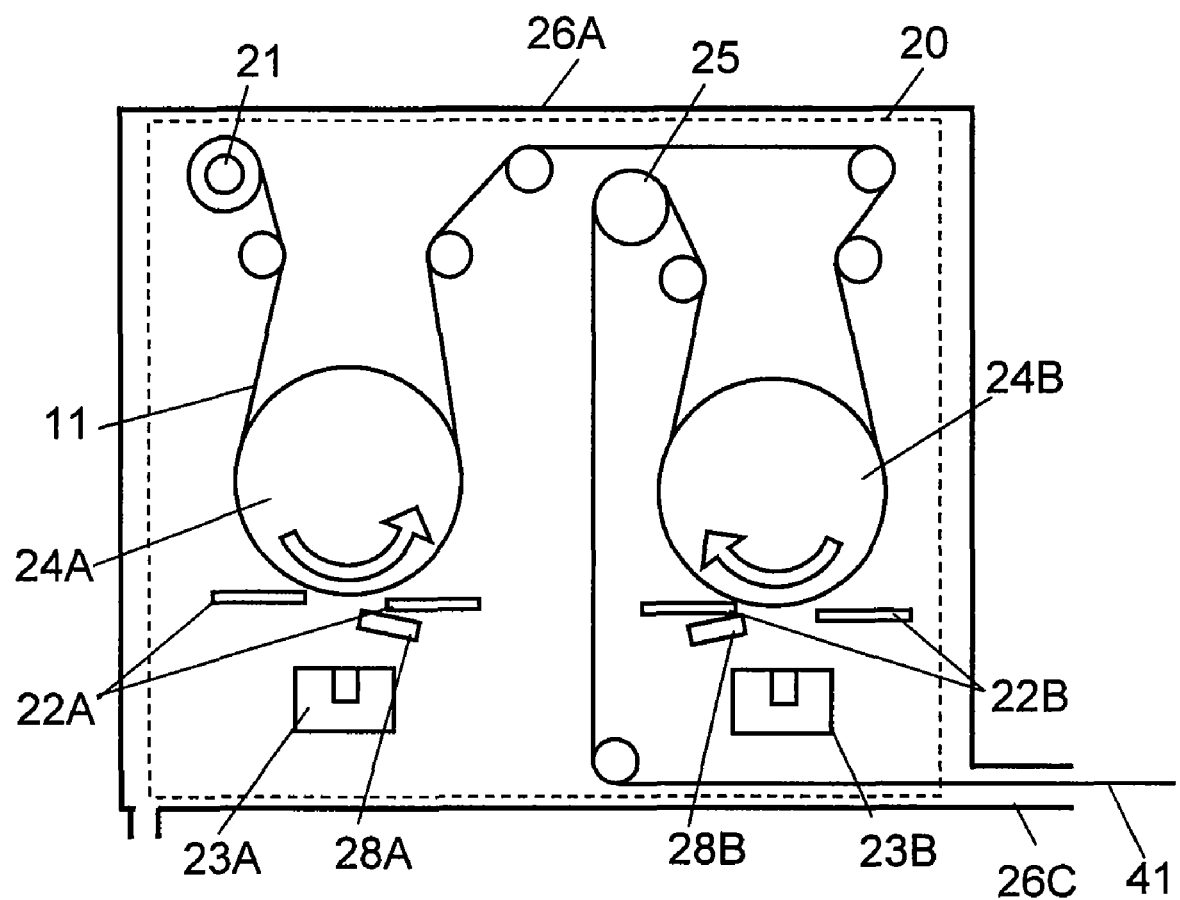
FIG. 3 is a schematic configuration view showing an active material layer formation section in the manufacturing apparatus shown in FIG. 2.
Figure 4:
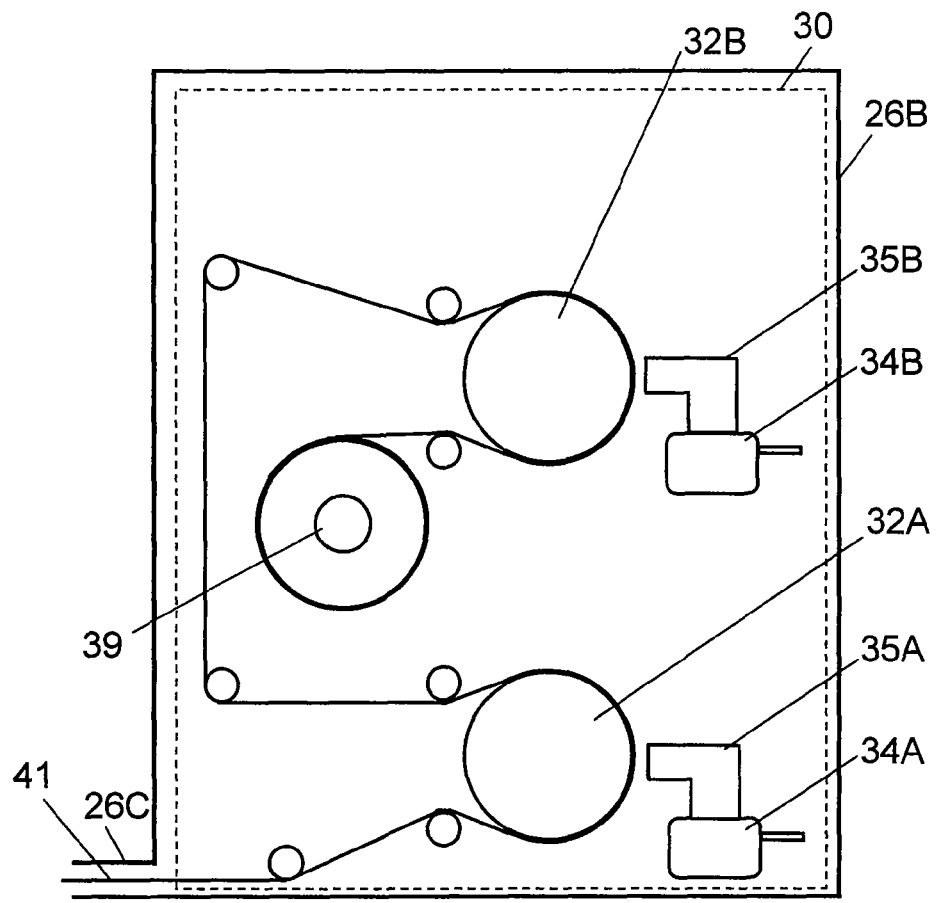
FIG. 4 is a schematic configuration view showing a lithium providing section in the manufacturing apparatus shown in FIG. 2.
Figure 5:
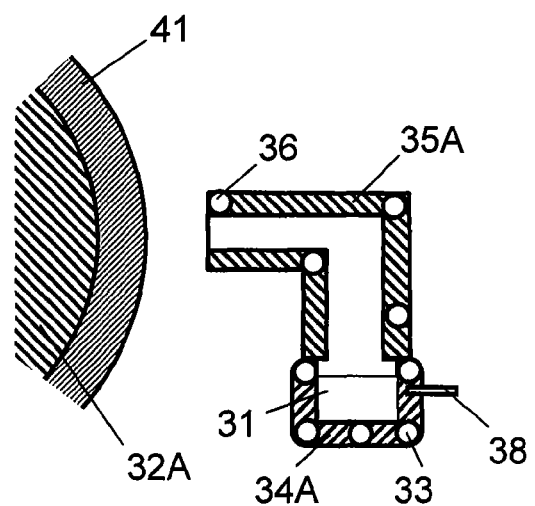
FIG. 5 is an enlarged sectional view showing a principal part in the lithium providing section shown in FIG. 4.

Next, with reference to FIGS. 2 to 5, a procedure and a manufacturing apparatus for producing negative electrode 6, in which an electrolytic copper foil is used for a current collector and an active material layer is formed of silicon oxide ($SiO_x$ (0<x<2)), are described. FIG. 2 is an entire configuration view showing an apparatus for manufacturing a negative electrode of a non-aqueous electrolyte secondary battery in accordance with the exemplary embodiment of the present invention. FIG. 3 is a schematic configuration view showing an active material layer formation section in the manufacturing apparatus shown in FIG. 2. FIG. 4 is a schematic configuration view showing a lithium providing section thereof. FIG. 5 is an enlarged sectional view showing a principal part in the lithium providing section shown in FIG. 4.

As shown in FIG. 2, this manufacturing apparatus has active material layer formation section 20 and lithium providing section 30. Active material layer formation section 20 is accommodated in chamber 26A and lithium providing section 30 is accommodated in chamber 26B, respectively. Chamber 26A and chamber 26B are connected to each other via passage 26C. That is to say, active material layer formation section 20 and lithium providing section 30 are accommodated in an integrated chamber. The pressure in chambers 26A and 26B and passage 26C is reduced by vacuum pump 27.

As shown in FIG. 3, active material layer formation section 20 has feeding roll 21, forming rolls 24A and 24B, masks 22A and 22B, vapor deposition units 23A and 23B, and nozzles 28A and 28B as air introducing sections. Then, current collector 11 is forwarded from feeding roll 21 to relay roll 25 via forming rolls 24A and 24B. Each of vapor deposition units 23A and 23B is composed of a vapor deposition source, a crucible and an electron beam generator that is a first heating section as one unit. Firstly, a procedure for forming an active material layer of negative electrode 6 on a current collector 11 using this apparatus is described.

As current collector 11, electrolytic copper foil having a thickness of, for example, 30 μm is used. The inside of chamber 26A is an inactive atmosphere that is approximate to a vacuum state, for example, an atmosphere of an argon gas with a pressure of about $10^{-3}$ Pa. At the time of vapor deposition, an electron beam generated by the electron beam generator is polarized by a polarization yoke, and the vapor deposition source is irradiated with the polarized electron beam. For the vapor deposition source, for example, a scrap material of Si (scrap silicon: its purity is 99.999%) generated when semiconductor wafer is formed is used. On the other hand, oxygen with high purity (for example, 99.7%) is introduced from nozzle 28A disposed in the vicinity of forming roll 24A into chamber 26A. In this way, Si vapor generated from vapor deposition unit 23A and oxygen introduced from nozzle 28A are reacted with each other, so that $SiO_x$ is deposited on current collector 11 and an active material layer is formed. As described, vapor deposition unit 23A, nozzle 28A, forming roll 24A form an active material layer made of $SiO_x$ on the surface of current collector 11 by a gas phase method using Si in an atmosphere that includes oxygen.

The opening of mask 22A allows Si vapor to be incident to the surface of current collector 11 as vertically as possible. Furthermore, by opening and closing mask 22A, a portion, in which an active material layer is not formed and current collector 11 is exposed, is formed.

Thereafter, current collector 11 is forwarded to forming roll 24B, and Si vapor is generated from vapor deposition unit 23B while oxygen is introduced into chamber 26A from nozzle 28B. Thus, an active material layer is formed also on another surface. Negative electrode precursor 41, in which the active material layers made of $SiO_x$ are formed on both surfaces of current collector 11 by this method, is forwarded to lithium providing section 30 via passage 26C.

Next, a procedure for providing lithium to the active material layers of negative electrode precursor 41 is described with reference to FIGS. 4 and 5. Lithium providing section 30 includes copper crucibles 34A and 34B, lithium vapor deposition nozzles 35A and 35B, cooling CANs 32A and 32B, and winding-up roll 39. In each crucible, rod heater 33 that is a second heater is incorporated. Since the configurations of copper crucible 34B, lithium vapor deposition nozzle 35B and cooling CAN 32B are the same as those of copper crucible 34A, lithium vapor deposition nozzle 35A and cooling CAN 32A, respectively, the description thereof is omitted.

As shown in FIG. 4, negative electrode precursor 41, which is forwarded via passage 26C, is disposed so that it is forwarded to winding-up roll 39 via cooling CANs 32A and 32B that are cooled to, for example, 20° C. Then, lithium that serves as a supply source of lithium vapor is input into copper crucible 34A into which rod heater 33 is incorporated, and lithium vapor deposition nozzle 35A into which rod heater 36 is incorporated is assembled into copper crucible 34A.

The pressure in chamber 26B is reduced to, for example, $3 \times 10^{-3}$ Pa. That is to say, the pressure of the atmosphere enclosing negative electrode precursor 41 and lithium is reduced. In order to generate a lithium vapor, electric power is applied to rod heater 33 so as to heat lithium 31 in copper crucible 34A. Furthermore, it is preferable that electric power is also applied to rod heater 36 in order to avoid cooling of lithium vapor inside lithium vapor deposition nozzle 35A and avoid precipitating of lithium. The temperatures of copper crucible 34A and lithium vapor deposition nozzle 35A are controlled to be, for example, 580° C. by monitoring with thermocouple 38. Herein, lithium vapor deposition nozzle 35A limits the movement route of the lithium vapor. The lithium vapor is supplied to negative electrode precursor 41 via lithium vapor deposition nozzle 35A, so that lithium is provided to one of the active material layers of negative electrode precursor 41. By limiting the movement route of lithium vapor in this way, the lithium vapor can be supplied to the active material layer efficiently.

Negative electrode precursor 41, in which lithium is provided to one of the active material layers, is forwarded to cooling CAN 32B, and lithium is provided also to the active material layer on the opposite surface from copper crucible 34B and lithium vapor deposition nozzle 35B. In this way, negative electrode precursor 41, in which lithium is provided to the active material layers on both surfaces, is wound up by winding-up roll 39. Thereafter, argon or dry air is introduced into chamber 26B so as to return the pressure to atmospheric pressure, negative electrode precursor 41 is cut into a predetermined dimension, and negative electrode lead 6A is coupled thereto. Thus, negative electrode 6 is produced.

As described above, an active material layer is provided on current collector 11 and lithium is provided to the active material layer using a lithium vapor in continuous space. Thus, it is possible to produce an active material with an intended composition and to provide lithium efficiently. Consequently, negative electrode 6 having a large capacity can be provided. As a phenomenon, even if argon or dry air is introduced into chamber 26B so as to return the pressure in chamber 26B to the atmospheric pressure after lithium is provided, heat generation in negative electrode precursor 41 is small. Furthermore, the provided lithium is diffusing in the active material layer.

Herein, "in continuous space" includes in the same space, in the same chamber or, as mentioned above, in separate chambers 26A and 26B that are communicated to each other via passage 26C.

In this exemplary embodiment, the atmosphere enclosing current collector 11 and Si scrap material that is a supply source material of the active material layer is reduced. Then, this Si scrap material is heated in vapor deposition units 23A and 23B. Meanwhile, oxygen that is air reacting with Si is introduced in the atmosphere from nozzles 28A and 28B. In this way, $SiO_x$, which is a reaction product between Si and oxygen, is deposited on current collector 11 so as to form an active material layer. By applying the reactive gas phase method, it is possible to produce an active material layer having an intended composition easily. Besides, it is possible to form a thin film of Si as an active material layer directly on current collector 11 under reduced pressure without introducing oxygen from nozzles 28A and 28B. When a thin film made of an active material is formed as an active material layer directly on current collector 11 under reduced pressure, the charge and discharge cycle characteristics are excellent because current collection can be always secured when using an active material such as $SiO_x$ and Si, having a large capacity but having large expansion and contraction.

Furthermore, in this exemplary embodiment, chamber 26A that provides space for forming an active material layer and chamber 26B that provides space for providing lithium to the active material layer are separated from each other and the two chambers are connected via passage 26C. Thus, the reaction between oxygen used for forming an active material layer and a lithium vapor is suppressed. Since a lithium vapor has high reactivity, it tends to react with oxygen. When such a reaction occurs, lithium compensation for the active material layer cannot be carried out. Therefore, it is preferable that space is separated in this way. Furthermore, it is further preferable that vacuum pump 27 is coupled to chamber 26A and atmosphere is reduced from chamber 26A. When the pressure reducing position is located at the side of chamber 26A, it is possible to further suppress the reaction between oxygen and lithium vapor.

Furthermore, in this exemplary embodiment, the atmosphere enclosing negative electrode precursor 41 and lithium that serves as a supply source of lithium vapor is reduced, and lithium that serves as the supply source of lithium vapor is heated for generating lithium vapor. In order to provide lithium, such a vacuum evaporation method is an effective method.

Figure 6:
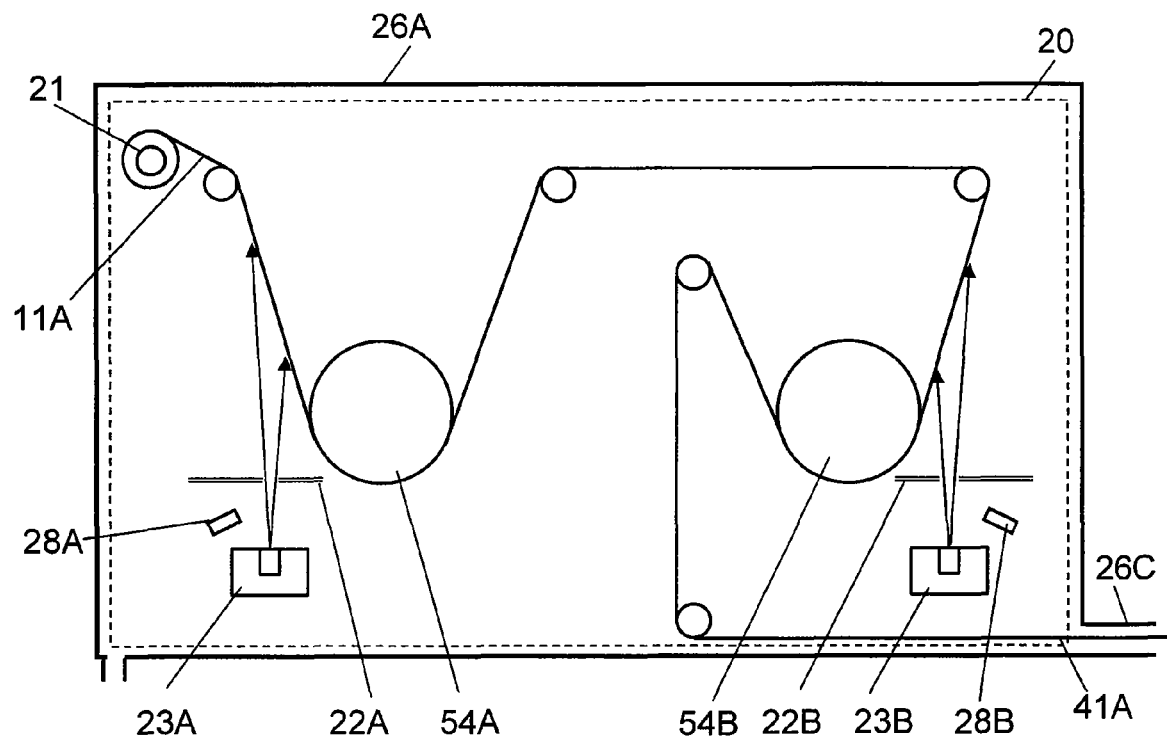
FIG. 6 is a schematic configuration view showing another active material layer formation section in an apparatus for manufacturing for a negative electrode of a non-aqueous electrolyte secondary battery in accordance with the exemplary embodiment of the present invention.
Figure 7:
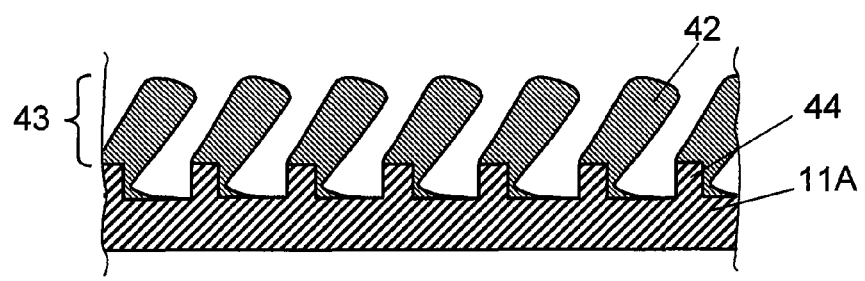
FIG. 7 is a schematic sectional view showing a negative electrode of a non-aqueous electrolyte secondary battery produced by using the active material layer formation section shown in FIG. 6.

Next, an active material layer formation section for forming a more preferable active material layer is described with reference to FIG. 6. FIG. 6 is a schematic configuration view showing an active material layer formation section in an apparatus for manufacturing for a negative electrode of a non-aqueous electrolyte secondary battery, which is used for manufacturing an active material having an inclined columnar structure, in accordance with an exemplary embodiment of the present invention. FIG. 7 is a schematic sectional view of a negative electrode produced by using the active material layer formation section of FIG. 6.

Active material layer formation section 20 shown in FIG. 6 has feeding roll 21, fulcrum rolls 54A and 54B, masks 22A and 22B, vapor deposition units 23A and 23B, and nozzles 28A and 28B. Since configurations other than fulcrum rolls 54A and 54B are the same as those in FIG. 3, the description is omitted. In this configuration, while current collector 11A is forwarded from feeding roll 21 to fulcrum rolls 54A and 54B, active material layers made of $SiO_x$, which is a reaction product of Si vapor from vapor deposition units 23A and 23B and oxygen from nozzles 28A and 28B, is formed on both surfaces of current collector 11A. These rolls and vapor deposition units 23A and 23B are provided in chamber 26A. A pressure in chamber 26A is reduced by vacuum pump 27.

As shown in FIG. 7, current collector 11A has a large number of protrusions 44 on the surface thereof. For example, a 30 μm-thick electrolytic copper foil having concavity and convexity (Ra=2.0 μm) by electrolytic plating is used as current collector 11A. Protrusions 44 are provided on both surfaces of current collector 11A, but only one surface is shown in FIG. 7 for simplification.

The inside of chamber 26A is made to be an atmosphere of a low-pressure inactive gas, for example, an atmosphere of an argon gas with a pressure of $10^{-3}$ Pa. At the time of vapor deposition, the vapor deposition source is irradiated with an electron beam generated by the electron beam generator and polarized by the polarization yoke. The shapes of the openings of masks 22A and 22B are adjusted so that Si vapor generated from vapor deposition units 23A and 23B is not vertically incident to the surface of current collector 11A.

In this way, current collector 11A is forwarded from feeding roll 21 while Si vapor is supplied to the surface of current collector 11A. Then, nozzle 28A is placed at a predetermined angle with respect to the incident direction of Si vapor. When oxygen is introduced into chamber 26A from nozzle 28A, active material lump 42 made of $SiO_x$ is generated in a way in which it grows from protrusion 44 as a starting point. At this time, for example, the predetermined angle is set to 65°, oxygen gas with a purity of 99.7% is introduced from nozzle 28A into chamber 26A and a film is formed at the film formation speed of about 20 nm/sec. As a result, 21 μm-thick columnar active material lump 42 made of $SiO_{0.4}$ is formed on each protrusion 44 of current collector 11A. Active material lumps 42 are formed on one surface before fulcrum roll 54A, then current collector 11A is forwarded to fulcrum roll 54B, and active material lumps 42 can be formed on another surface by the same method. As mentioned above, negative electrode precursor 41A, in which active material layers 43 are formed on both surfaces of current collector 11A, is produced.

Note here that heat resistant tapes are attached in equal intervals on both surfaces of current collector 11A in advance and these tapes are detached after the films are formed. Thereby, exposed portions to which negative electrode lead 6A is welded can be formed. Thereafter, lithium is provided to active material layers 43 on both surfaces by using lithium providing section 30 shown in FIG. 4.

In this way, it is preferable that active material layer 43 is formed as a plurality of columnar active material lumps 42 on current collector 11A. In addition to the above-mentioned method, by the methods disclosed in Japanese Patent Application Unexamined Publication Nos. 2003-17040 and 2002-279974, negative electrode 6 having current collector 11A and a plurality of columnar active material lumps provided on the surface of current collector 11A may be produced. When the active material has a columnar structure, since expansion of the active material can be absorbed in the space between columns, it is effective with respect to the expansion and contract of the active material as compared with a smooth film structure.

Furthermore, it is further preferable that active material lump 42 is formed so that it is inclined with respect to the thickness direction of current collector 11A. By inclining active material lump 42 with respect to the thickness direction of current collector 11A, the expansion and contraction of the active material can be absorbed in the space effectively and the charge and discharge cycle characteristics of negative electrode 6 can be improved. The reason therefor is not clear, but one of the reasons is thought to be as follows. An elements having a lithium-ion absorbing property is expanded and contracted when it absorbs and releases lithium ions. Stress accompanied by the expansion and contraction is dispersed in the parallel direction and the vertical direction to the surface having active material lump 42 of current collector 11A. Therefore, the generation of wrinkle of current collector 11A and exfoliation of active material lump 42 are suppressed, so that the charge and discharge cycle characteristics are thought to be improved. Furthermore, since this is a shape capable of forming a film at a high speed, this is preferable from the viewpoint of mass productivity.

Figure 8:
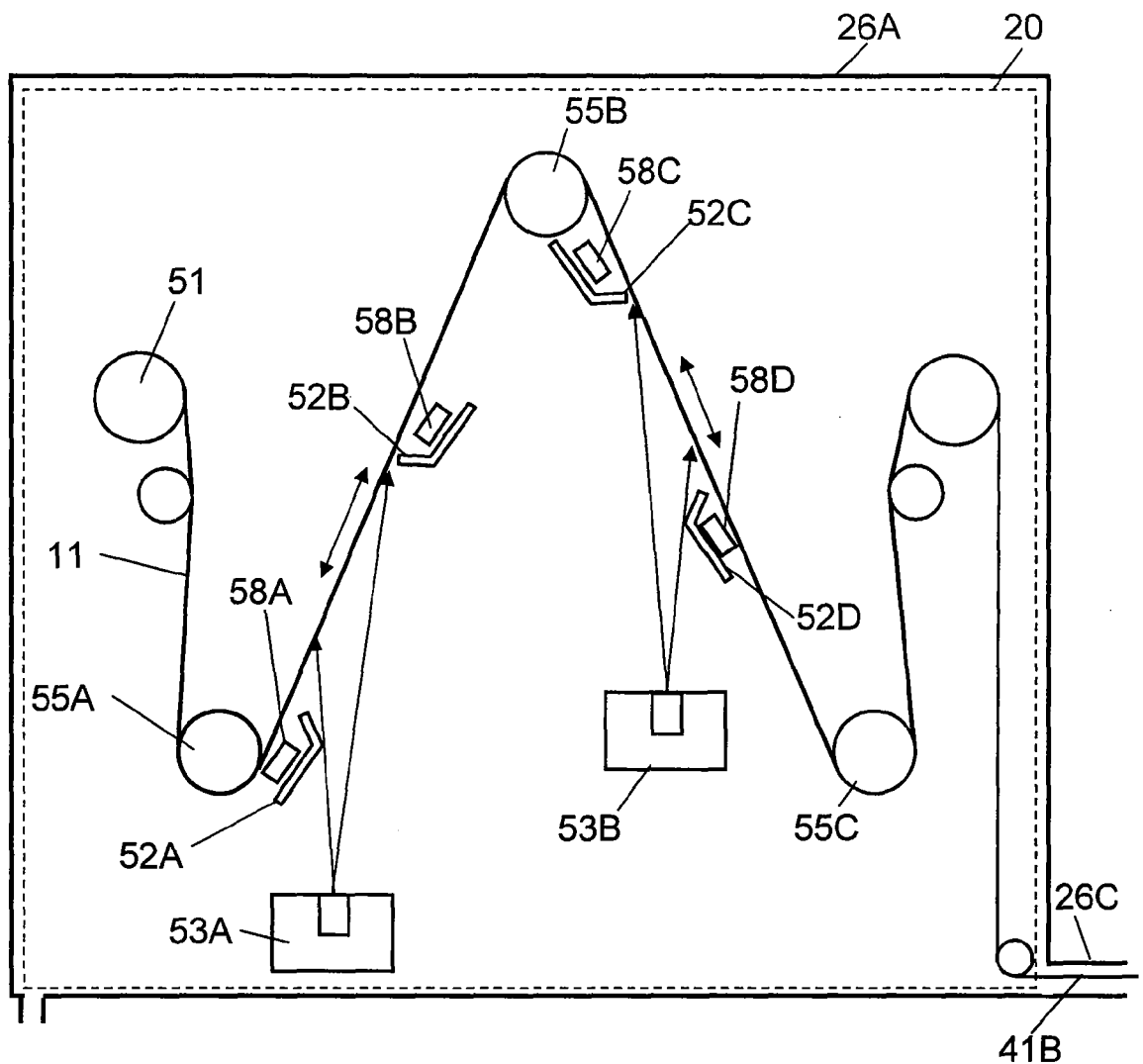
FIG. 8 is a schematic configuration view showing still another active material layer formation section in an apparatus for manufacturing for a negative electrode of a non-aqueous electrolyte secondary battery in accordance with the exemplary embodiment of the present invention.
Figure 9:
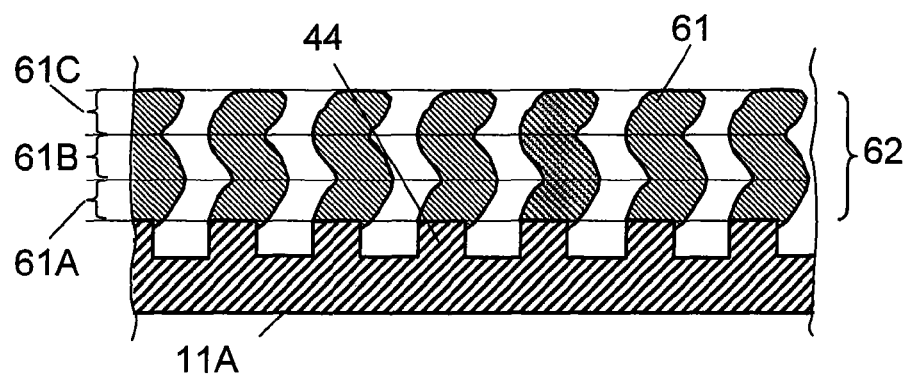
FIG. 9 is a schematic sectional view showing a negative electrode of a non-aqueous electrolyte secondary battery produced by using the active material layer formation section shown in FIG. 8.

Next, an active material layer formation section for forming an active material layer of a further preferable embodiment is described with reference to FIG. 8. FIG. 8 is a schematic configuration view showing an active material layer formation section of an apparatus for manufacturing a negative electrode of a non-aqueous electrolyte secondary battery in accordance with an exemplary embodiment of the present invention. The apparatus can make an active material having a columnar structure with bending points. FIG. 9 is a schematic sectional view of a negative electrode produced by using the active material layer formation section shown in FIG. 8. Note here that FIG. 9 shows only one surface of negative electrode 6 for simplification. Current collector 11A shown in these drawings is the same as current collector 11A shown in FIGS. 6 and 7.

Active material layer formation section 20 shown in FIG. 8 includes feeding roll 51, fulcrum rolls 55A, 55B and 55C, masks 52A, 52B, 52C and 52D, vapor deposition units 53A and 53B, and nozzles 58A, 58B, 58C and 58D. Fulcrum roll 55A is a first fulcrum, fulcrum roll 55B is a second fulcrum, and fulcrum roll 55C is a third fulcrum. These are provided in chamber 26A. The pressure in chamber 26A is reduced by vacuum pump 27. Vapor deposition units 53A and 53B are the same as vapor deposition units 23A and 23B shown in FIGS. 3 and 6.

Next, as shown in FIG. 9, a procedure for forming active material layer 62 that is an active material layer of one side of the negative electrode on current collector 11A is described. The inside of chamber 26A is an inactive atmosphere that is approximate to a vacuum state, for example, an atmosphere of an argon gas with a pressure of $10^{-3}$ Pa. At the time of vapor deposition, the vapor deposition source is irradiated with an electron beam generated by the electron beam generator and polarized by the polarization yoke. For the vapor deposition source, for example, a Si scrap material is used. Vapor deposition unit 53A is disposed on a position between fulcrum roll 55A and fulcrum roll 55B so that Si vapor is obliquely incident to current collector 11A. Thus, the Si vapor generated from vapor deposition unit 53A is not incident vertically to the surface of current collector 11A. Similarly, vapor deposition unit 53B is disposed on a position between fulcrum roll 55B and fulcrum roll 55C so that Si vapor is obliquely incident to current collector 11A.

Masks 52A, 52B, 52C and 52D cover nozzles 58A, 58B, 58C and 58D, respectively. In this configuration, current collector 11A is forwarded from feeding roll 51 while the Si vapor is supplied to the surface of current collector 11A from vapor deposition unit 53A. At this time, oxygen with high purity is introduced to current collector 11A from nozzles 58A and 58B. Then, the Si vapor generated from vapor deposition unit 53A and the introduced oxygen are reacted with each other and first columnar body 61A made of $SiO_x$ is generated on current collector 11A in a manner that it grows from protrusion 44 as a starting point.

Next, current collector 11A on which first columnar body 61A is formed moves toward a position to which the Si vapor is supplied from vapor deposition unit 53B. At this time, when oxygen with high purity is introduced from nozzles 58C and 58D to current collector 11A, the Si vapor generated from vapor deposition unit 53B and the introduced oxygen are reacted with each other, and second columnar body 61B made of $SiO_x$ is generated so that it grows from first columnar body 61A as a starting point. At this time, as shown in FIG. 9, second columnar body 61B grows in the direction opposite to that of first columnar body 61A because of the position of vapor deposition unit 53B with respect to current collector 11A.

That is to say, vapor deposition unit 53A, nozzles 58A and 58B, fulcrum rolls 55A and 55B constitutes a first formation section. This first formation section forms first columnar body 61A made of $SiO_x$ that grows obliquely from protrusion 44 on the surface of current collector 11A having a plurality of protrusions 44 on at least one surface thereof. On the other hand, vapor deposition unit 53B, nozzles 58C and 58D, fulcrum rolls 55B and 54C constitute a second formation section. This second formation section forms second columnar body 61B made of SiO$_x$ that obliquely grows from first columnar body 61A to increase the thickness of active material layer 62.

When the rotation direction of feeding roll 51 is reversed in this state, the Si vapor generated from vapor deposition unit 53A and the introduced oxygen are reacted with each other and third columnar body 61C made of SiO$_x$ is generated so that it grows from second columnar body 61B as a starting point. Also in this case, as shown in FIG. 9, third columnar body 61C grows in the opposite direction to second columnar body 61B. In this way, it is possible to form active material layer 62 composed of active material lump 61 having a columnar structure with bending points. In addition, when the rotation direction of feeding roll 51 is reversed, a fourth columnar body can be produced on third columnar body 61C. That is to say, the number of bending points can be controlled freely.

As mentioned above, by using active material layer formation section 20 shown in FIG. 8, negative electrode precursor 41B, which includes active material layer 62 composed of active material lumps 61 having a columnar structure with a bending point, is produced. Then, lithium is provided to active material layer 62 on negative electrode precursor 41B by using a lithium providing section having a configuration in which cooling CAN 32B, copper crucible 34B, and lithium vapor deposition nozzle 35B are not used in lithium providing section 30 shown in FIG. 4. In this way, negative electrode precursor 41B, in which lithium is provided to active material layer 62 formed on one surface of current collector 11A, is wound up by winding-up roll 39. Thereafter, by introducing argon or dry air into chamber 26B so as to return the pressure to atmospheric pressure. Then, if necessary, in order to form active material layer 62 and to provide lithium on the other surface of current collector 11A, current collector 11A is set to winding-up roll 21 again.

In negative electrode 6 including active material layer 62 composed of active material lumps 61 having a columnar structure with a bending point, even if active material lumps 61 expand at the time of charging, active material lumps 61 are less interfered three-dimensionally with each other as compared with active material lumps 42 shown in FIG. 7. Therefore, from the viewpoint of the charge and discharge cycle characteristics, it is more preferable than a negative electrode having a structure shown in FIG. 7.

As mentioned above, when active material layer formation section 20 shown in FIG. 8 is used, after active material layer 62 is formed on one surface of current collector 11A, lithium is provided to active material layer 62. Then, the vacuum atmosphere is released. On the other hand, in the apparatus shown in FIGS. 3, 4 and 6, after active material layers are formed on the both surfaces of current collector 11 or current collector 11A, lithium is provided to these active material layers. That is to say, it is not necessary that the active material layers are formed on both surfaces of the current collector and then lithium is provided to the active material layers.

In the above-mentioned exemplary embodiments, a cylindrical battery is used as an example. However, the same effect can be obtained even when a rectangular-shaped battery is used, for example. Furthermore, an active material layer is formed on only one surface of current collector 11 or 11A and a coin type battery may be produced. Furthermore, in the above-mentioned exemplary embodiments, a non-aqueous electrolyte secondary battery is described as an example, but the present invention can be applied to an electrochemical element such as a capacitor as long as it uses a lithium ion as a charge carrier and at least one of the electrodes has an irreversible capacity.

Note here that in this exemplary embodiment, lithium is provided to an active material layer by a vacuum evaporation method. However, a method is not necessarily limited to this method. For example, lithium can be provided to an active material layer by heat transfer printing of a lithium foil. Also in such a case, by carrying out formation of an active material layer and providing of lithium in the same space continuously, an active material having an intended composition can be produced and lithium can be provided efficiently.

INDUSTRIAL APPLICABILITY

An electrochemical element using an electrode having a lithiation treatment in the manufacturing method of the present invention has a large capacity and a long lifetime. Therefore, a non-aqueous electrolyte solution secondary battery that is one kind of the electrochemical elements is useful as a driving power source of electronic equipment such as a notebook-sized personal computer, a portable telephone and a digital still camera, and furthermore, a power source for an electric power storage and a power source of an electric vehicle requiring high power. The present invention provides a very important and effective means because it can improve the productivity in manufacturing the above-mentioned electrochemical element.

The invention claimed is:

1. A method for manufacturing an electrode of an electrochemical element, the electrode being capable of electrochemically absorbing and releasing a lithium ion, the method comprising steps of:
    (A) forming an active material layer on a current collector by heating a material that serves as a supply source of the active material layer in a pressure-reduced atmosphere and introducing gas that reacts with the material, thereby depositing a reaction product between the material and the gas on the current collector; and
    (B) providing lithium to the active material layer while preventing the gas from reacting with the lithium, wherein:
    the step (A) and the step (B) are carried out in a continuous pressure-reduced space,
    the step (A) is performed in a first vacuum chamber and the step (B) is performed in a second vacuum chamber,
    the first vacuum chamber and the second vacuum chamber are connected with a passage for suppressing movement of the gas from the first vacuum chamber to the second vacuum chamber, and
    the continuous pressure-reduced space is depressurized only from the first vacuum chamber to suppress movement of the gas from the first vacuum chamber to the second vacuum chamber.

2. The method for manufacturing an electrode of an electrochemical element according to claim 1, wherein in the step (B), a source material of lithium is heated, melted and vaporized by a heater, thereby providing lithium to the active material layer.

3. The method for manufacturing an electrode of an electrochemical element according to claim 1, wherein:
    a precursor of the electrode is formed in the first vacuum chamber by performing the step (A),
    the precursor is carried to the second vacuum chamber through the passage, and
    the second vacuum chamber is depressurized via the passage.

* * * * *